US 6,588,694 B1

(12) United States Patent
Wilkerson (10) Patent No.: US 6,588,694 B1
(45) Date of Patent: Jul. 8, 2003

(54) TAKE-UP REEL LEADER FOR DLT TAPE DRIVE (75) Inventor: Dale A. Wilkerson, Worcester, MA (US)

(73) Assignee: Quantum Corporation, Milpitas, CA (US)

(*) Notice: Subject to any disclaimer, the term of this patent is extended or adjusted under 35 U.S.C. 154(b) by 0 days.

(21) Appl. No.: 09/515,463

(22) Filed: Feb. 29, 2000

(51) Int. Cl.⁷ .............................................. G11B 15/665
(52) U.S. Cl. ................. 242/332.4; 242/348.2; 242/332.1
(58) Field of Search .................... 242/332.4, 348.2, 242/332.1

(56) References Cited

U.S. PATENT DOCUMENTS

| 1,655,297 | A | * | 1/1928 | Thornton | 242/332.4 |
| 3,706,423 | A | * | 12/1972 | Neff | 242/332.4 |
| 3,724,776 | A | * | 4/1973 | McKee | 242/332.4 |
| 3,880,382 | A | * | 4/1975 | Jantzen et al. | 242/332.4 |
| 4,572,460 | A | * | 2/1986 | Hertrich | 242/332.4 |
| 4,662,049 | A | | 5/1987 | Hertrich | |
| 4,720,913 | A | | 1/1988 | Hertrich | |
| 5,542,620 | A | | 8/1996 | Ohshita | |
| 5,769,346 | A | * | 6/1998 | Daly | 242/332.4 |
| 6,092,754 | A | * | 7/2000 | Rathweg et al. | 242/332.4 |
| 6,095,445 | A | * | 8/2000 | Hentrich | 242/332.4 |
| 6,186,430 | B1 | * | 2/2001 | Zweighaft | 242/332.4 |
| 6,227,475 | B1 | * | 5/2001 | McAllister et al. | 242/332.7 |
| 6,257,514 | B1 | * | 7/2001 | Morris et al. | 242/332.1 |

FOREIGN PATENT DOCUMENTS

| GB | 716632 | 10/1954 |
| GB | 1167445 | 10/1969 |

* cited by examiner

Primary Examiner—Donald P. Walsh
Assistant Examiner—Daniel K Schlak
(74) Attorney, Agent, or Firm—James P. Broder; Steven G. Roeder (57) ABSTRACT

A tape drive (10) and cartridge (22) combination is provided herein. The tape drive (10) and cartridge (22) include an improved buckle (30) that securely couples a drive leader (32) of the tape drive (10) to a cartridge leader (28) of the cartridge (22) and inhibits half-ear situations. As provided herein, the buckle (30) includes a first buckle component (54) and a second buckle component (56) that securely couple the leaders (28) (32). More specifically, the first buckle component (54) includes a receiver (60) and the second buckle component (56) includes a tab (58) that engages the receiver (60) to securely couple the leaders (28) (32). The tab (58) has a nose (62) and a neck (64). The nose (62) includes a pair of opposed proximal edges (69) that cantilever away from the neck (64) and engage the receiver (60) to couple buckle components (54) (56). Importantly, the opposed proximal edges (69) of the nose (62) are curved. This inhibits half-ear situations, reduces the possibility of leader runaway and improves the reliability of the tape drive (10).

20 Claims, 6 Drawing Sheets

TAKE-UP REEL LEADER FOR DLT TAPE DRIVE

FIELD OF THE INVENTION

The present invention relates generally to tape drives which use a removable cartridge having a storage tape. More specifically, the present invention relates to a buckle for a tape drive and cartridge that minimizes the likelihood of leader runaway.

BACKGROUND

Tape drives are widely used for storing information in digital form. These tape drives commonly use a storage tape having a thin film of magnetic material which receives the information. Typically, the storage tape is guided with a plurality of tape guides between a pair of spaced apart reels, past a data transducer. The data transducer records information onto the moving storage tape and/or reads information from the moving storage tape.

In one type of tape drive, one of the reels is part of the tape drive, while the other reel is part of a removable cartridge. For this type of tape drive, the reel that is a part of the tape drive is commonly referred to as a take-up reel, while the reel that is a part of the cartridge is commonly referred to as a cartridge reel. With this system, upon insertion of the cartridge into the tape drive, it is necessary to couple the storage tape on the cartridge reel to the take-up reel of the tape drive. Subsequently, the storage tape must be uncoupled from the take-up reel, prior to removing the cartridge from the tape drive.

Typically, a cartridge leader on the storage tape is automatically coupled to a drive leader that is connected to the take-up reel during insertion of the cartridge into the tape drive. The procedure of connecting the drive leader to the cartridge leader is commonly referred to as "buckling" or "coupling". Subsequently, during ejection of the cartridge, the cartridge leader is unbuckled from the drive leader.

Figure 1A:
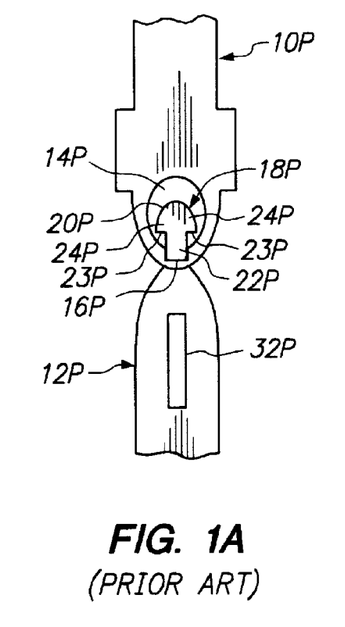
FIG. 1A is a top plan view of an uncoupled, prior art cartridge leader and drive leader.
Figure 1B:
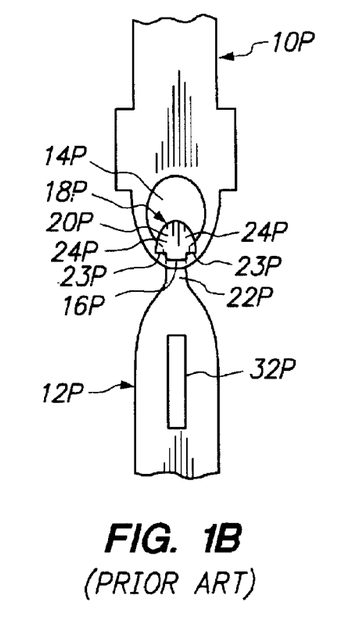
FIG. 1B is a top plan view of a coupled, prior art cartridge leader and drive leader.

FIGS. 1A and 1B illustrate a prior art cartridge leader 10P and a prior art drive leader 12P at two alternate positions during coupling. In particular, FIG. 1A illustrates the prior art leaders 10P, 12P prior to coupling and FIG. 1B illustrates the prior art leaders 10P, 12P coupled together. In this prior art embodiment, the cartridge leader 10P includes a hoop portion 14P and a slot portion 16P, while the drive leader 12P includes a tab 18P having a nose 20P and a neck 22P. The nose 20P includes a pair of proximal, opposed edges 23P that extend away from the neck 22P, substantially perpendicular to the neck 22P. Stated another way, the nose 20P includes a pair of opposed ears 24P that cantilever away from the neck 22P The hoop portion 14P is dimensioned to enable the nose 20P and neck 22P of the drive leader 12P to pass therethrough. The slot portion 16P is dimensioned to receive the neck 22P, but prevent the ears 24P of the nose 20P from passing therethrough. Buckling of the two leaders 10P, 12P is done by initially tucking the tab 18P within the hoop portion 14P as illustrated in FIG. 1A and subsequently pulling the drive leader 12P until the neck 22P slides into the slot portion 16P of the cartridge leader 10P as illustrated in FIG. 1B.

Figure 1C:
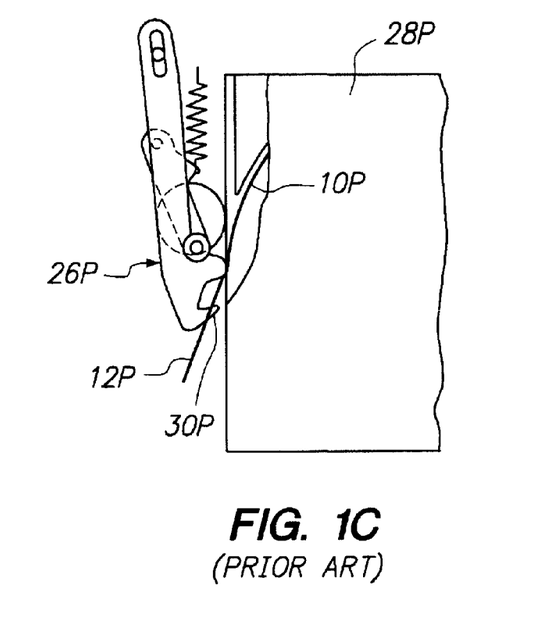
FIG. 1C is a top plan view of a prior art buckler and a portion of a prior art cartridge.

FIG. 1C illustrates a prior art buckler 26P that automatically couples the prior art cartridge leader 10P of a cartridge 28P to the prior art drive leader 12P. With this system, the prior art buckler 26P includes a hook 30P that fits into a drive leader aperture 32P (illustrated in FIGS. 1A and 1B) in the drive leader 12P.

The design illustrated in FIG. 1C utilizes the movement of the cartridge 28P into and out of the tape drive to buckle and subsequently unbuckle the cartridge leader 10P and the drive leader 12P. More specifically, with this system, the hook 30P is rotated by the cartridge 28P during insertion of the cartridge 28P into the tape drive. At the same time, a take-up motor pulls the drive leader 12P away from the cartridge 28P. If the leaders 10P, 12P are in good condition and are properly positioned, the neck 22P of the drive leader 12P slides into the slot portion 16P of the cartridge leader 10P and both ears 24P slide behind the slot portion 16P to successfully couple the leaders 10P, 12P. Commonly assigned U.S. Pat. Nos. 4,662,049 and 4,720,913 provide a detailed discussion of this type of tape buckling arrangement.

Unfortunately, this type of buckling operation provides only one opportunity to couple the leaders 10P, 12P. The buckling operation will be successful if the leaders 10P, 12P are in good condition and are properly positioned. However, one or both of the leaders 10P, 12P may not be in the proper position for coupling. For example, the cartridge leader 10P may not be in the correct position if the cartridge 28P is inserted too slowly or too quickly into the tape drive. Additionally, the cartridge leader 10P may be damaged from improper or excessive use and may not be in the correct position. If one or both of the leaders 10P, 12P are not in the correct position, the leaders 10P, 12P may not securely couple. For example, only a portion of the tab 18P, e.g. only one of the opposed ears 24P, may be positioned within the hoop portion 14P. In this situation, as the neck 22P of the drive leader 12P slides into the slot portion 16P of the cartridge leader 10P, only one of the ears 24P is positioned behind the slot portion 16P of the cartridge leader 10P. This situation is commonly referred to as a "half-ear situation".

With the design outlined above, the hook 30P releases the drive leader 12P upon insertion of the cartridge 28 even if the leaders 10P, 12P are only partly coupled. Subsequently, during movement of the leaders 10P, 12P towards the take-up reel, the partly coupled leaders 10P, 12P can become uncoupled. This will cause the drive leader 12P to retract onto the take-up reel. This is commonly referred to as "leader runaway". Unfortunately, after leader runaway occurs, the tape drive must be disassembled to reposition the drive leader 12P on the hook 30P. This can be very expensive. Further, the tape drive can't be used until the drive leader 12P is repositioned on the hook 30P. This can be very inconvenient to the customer because of the down time of the tape drive.

Currently, tape drives are being developed that test whether the leaders are securely coupled prior to the buckler releasing the drive leader. In particular, U.S. patent application Ser. No. 09/515,461, by Kumar Kasetty, entitled "BUCKLING SYSTEM FOR A TAPE DRIVE", filed concurrently herewith and assigned to Quantum Corporation discloses a buckling system that provides multiple opportunities to couple the drive leader to the cartridge leader. The buckling system includes a detector for testing whether coupling was successful prior to the buckler releasing the drive leader. The contents of U.S. patent application Ser. No. 09/515,461 are incorporated herein by reference.

Unfortunately, a partly coupled leader can fool the detector. More specifically, in a half-ear situation, one of the ears 24P of the drive leader 12P can retain the cartridge leader 10P sufficiently to fool the detector. Subsequently, however, the one ear 24P can release the cartridge leader 10P during movement of the leaders 10P, 12P past the tape guides and transducer. This will cause leader runaway.

In light of the above, it is an object of the present invention to provide a buckle for a tape drive and cartridge that resists half-ear situations and other situations in which the leaders are only partly coupled. Another object is to provide a tape drive that automatically and reliably couples and de-couples the storage tape to the take-up reel. Still another object is to provide a tape drive having an improved drive leader that minimizes the likelihood of leader runaway. Another object is to provide a tape drive which is compatible with prior art cartridges.

SUMMARY

The present invention is directed to a combination of a tape drive and cartridge that satisfies these objectives. The tape drive and cartridge include an improved buckle that couples a drive leader of the tape drive to a cartridge leader of the cartridge. The buckle includes a first buckle component that is secured to one of the leaders and a second buckle component that is secured to the other leader. The first buckle component includes a receiver having a slot portion and a hoop portion. The second buckle component includes a tab that engages the receiver to couple the buckle components and the leaders.

The tab has a nose and a neck. The nose is sized and shaped to fit within the hoop portion but not the slot portion of the receiver. The neck is sized and shaped to fit within both the hoop portion and the slot portion of the receiver. The nose includes a pair of opposed proximal edges that cantilever away from the neck and engage the first buckle component to couple buckle components.

Importantly, at least one, and more preferably both, of the opposed proximal edges are curved or arc shaped. As a result of this shape, the cartridge leader will not move with the drive leader unless both proximal edges of the nose are tucked behind the slot portion of the receiver. Stated another way, with this design, the tab will release the receiver if only one of opposed proximal edges is engaging the receiver. This reduces the likelihood of a half-ear situation resulting in leader runaway.

The present invention is also directed to a method for coupling a drive leader of a tape drive to a cartridge leader of a cartridge. The method includes the step of providing a first buckle component and a second buckle component. The second buckle component includes a nose having opposed proximal edges that are curved. As discussed above, this inhibits half-ear situations, reduces the likelihood of leader runaway and improves the reliability of the tape drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figures 2, 3:
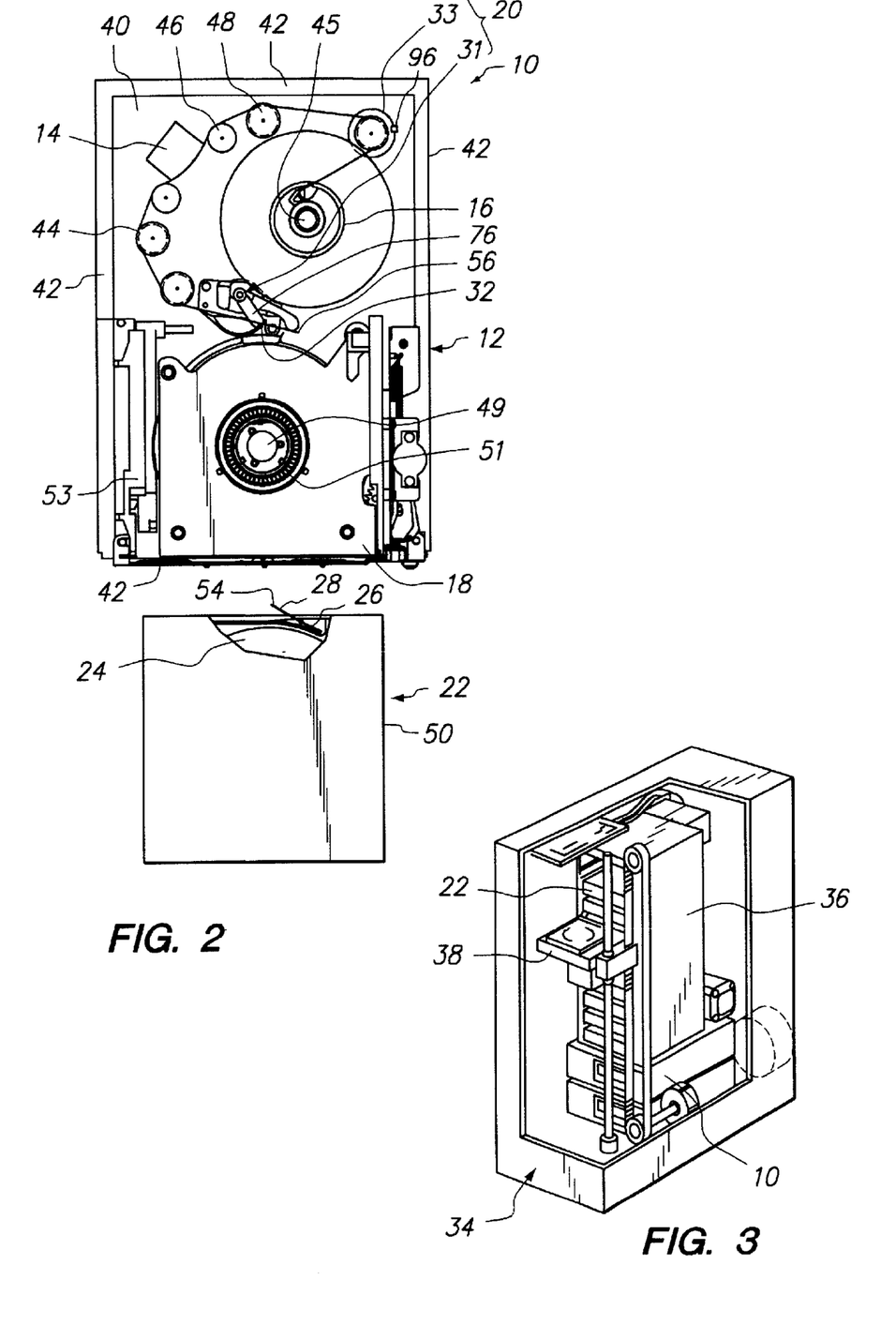
FIG. 2 is a top plan view of a portion of a tape drive and a cartridge, in partial cut-away, having features of the present invention.
FIG. 3 is a perspective, partly cut-away view of a tape library having features of the present invention.

Referring initially to FIG. 2, a tape drive 10 having features of the present invention includes a drive housing 12, a data transducer 14, a take-up reel 16, a cartridge receiver 18, and a buckling system 20. The tape drive 10 is designed for use in conjunction with a cartridge 22 including a cartridge reel 24 and a storage tape 26 having a cartridge leader 28. A buckle 30 (illustrated in FIGS. 4A–4C) secures a drive leader 32 of the tape drive 10 to the cartridge leader 28. The buckling system 20 includes a buckler 31 that moves the drive leader 32 relative to the cartridge leader 28 to couple and uncouple the buckle 30 and the leaders 28, 32. After coupling of the leaders 28, 32, rotation of the take-up reel 16 results in movement of the storage tape 26 from the cartridge reel 24 past the data transducer 14.

Preferably, the buckling system 20 also includes a detector 33 that checks to determine if the cartridge leader 28 is securely coupled to the drive leader 32. This feature allows the tape drive 10 to make multiple attempts, if necessary, to couple the drive leader 32 to the cartridge leader 28.

Uniquely, as provided below, the buckle 30 is designed to inhibit partly coupled leaders 28, 32, including half-ear situations. This minimizes the likelihood that partly coupled leaders 28, 32 can fool the detector 33. This also minimizes the likelihood of leader runaway.

The tape drive 10 is typically installed within a computer (not shown), or a word processor (not shown). Alternately, as illustrated in FIG. 3, the tape drive 10 can be utilized as part of a tape library 34. In the embodiment illustrated in FIG. 3, the tape library 34 includes a plurality of cartridges 22 which are retained in a cartridge magazine 36, a robotic cartridge handler 38 and a pair of tape drives 10. The robotic cartridge handler 38 selectively retrieves one of the cartridges 22 from the cartridge magazine 36 and places the cartridge 22 within one of the tape drives 10. A suitable tape library 34 is sold under the trademark DLTstor™, by Quantum Corporation.

A detailed description of the various components of the tape drive 10 is provided in U.S. Pat. No. 5,371,638, issued to Saliba, and assigned to Quantum Corporation, the Assignee of the present invention. The contents of U.S. Pat. No. 5,371,638 are incorporated herein by reference.

Accordingly, only the structural aspects of the tape drive 10 which are particularly significant to the present invention are provided herein. A representative tape drive 10 is sold by Quantum Corporation, the Assignee of the present invention under the trademark DLT™ 4000.

The drive housing 12 retains the various components of the tape drive 10. The drive housing 12 typically includes a base 40, four spaced apart side walls 42 and a cover (not illustrated in FIG. 2 for clarity).

The tape drive 10 also includes a plurality of spaced apart tape guides 44 for guiding the storage tape 26 past the data transducer 14 and onto the take-up reel 16. The number, design and location of the tape guides 44 can be varied to suit the design requirements of the tape drive 10. In the embodiment illustrated in the Figures, the tape drive 10 includes six, spaced apart tape guides 44 that guide the storage tape 26 along a path between the cartridge reel 24 and the take-up reel 16, past the data transducer 14. Each tape guide 44 can include a guide body 46 and a guide shaft 48. In the embodiments provided herein, each guide body 46 is cylindrically shaped and rotates about the guide shaft 48. The guide shaft 48 is secured to the drive housing 12.

The tape drive 10 also includes a take-up motor 45 for selectively rotating the take-up reel 16. Rotation of the take-up reel 16 in the clockwise direction results in movement of the drive leader 32 relative to the rest of the tape drive 10.

The storage tape 26 stores data in a form that can be subsequently retrieved if necessary. A magnetic storage tape 26 is commonly used to store data in digital form. For conservation of space, the storage tape 26 has a tape width of preferably at least approximately one-half inch (0.5 in). Alternately, for example, the storage tape 26 can have a tape width of between approximately four millimeters and eight millimeters (4.0 mm-8.0 mm). The storage tape 26 includes a storage surface on one side of the storage tape 26 for storing data. The storage surface is divided into a plurality of tracks (not shown). Each track can be a linear pattern that extends the length of the storage tape 26. Alternately, for example, the data can be recorded in diagonal strips across the storage tape 26. The storage tape 26 is initially retained on the cartridge reel 24 of the cartridge 22.

The cartridge 22 includes a substantially rectangular cartridge housing 50 that encloses the cartridge reel 24 and the storage tape 26. The cartridge housing 50 includes a cartridge door 52 (illustrated in FIGS. 7A, 8A and 9) that pivots between an open position, in which the cartridge leader 28 is exposed, and a closed position.

The cartridge receiver 18 is positioned within the drive housing 12 and selectively receives the cartridge 22. The cartridge receiver 18 includes a protruding wall 53 that contacts the cartridge door 52 during movement of the cartridge 22 into the cartridge receiver 18. This causes the cartridge door 52 to move from the closed position to the open position.

The tape drive 10 also includes a cartridge reel motor 49 that engages the cartridge reel 24 and rotates the cartridge reel 24. More specifically, the cartridge reel motor 49 is coupled to a drive gear 51 that selectively extends into the cartridge receiver 18. The drive gear 51 engages a similar cartridge gear (not shown) on the bottom of the cartridge reel 24 to link the cartridge reel motor 49 to the cartridge reel 24. Subsequently, the cartridge reel motor 49 is able to rotate the cartridge reel 24 in.the cartridge 22.

The buckle 30 secures the drive leader 32 of the tape drive 10 to the cartridge leader 28 of the cartridge 22. The buckle 30 includes a first buckle component 54 attached to the cartridge leader 28 and a second buckle component 56 attached to the drive leader 32.

Figure 4A:
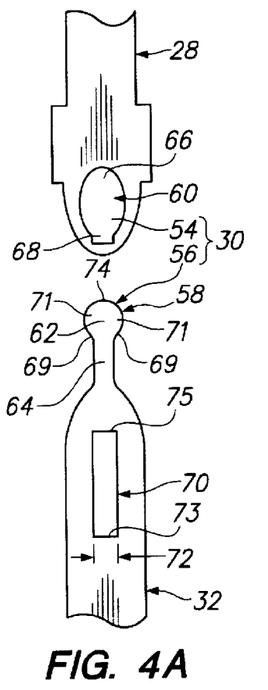
FIGS. 4A–4C are top plan views of a portion of a cartridge leader and a portion of a drive leader having features of the present invention during alternate stages of coupling.
Figure 4B:
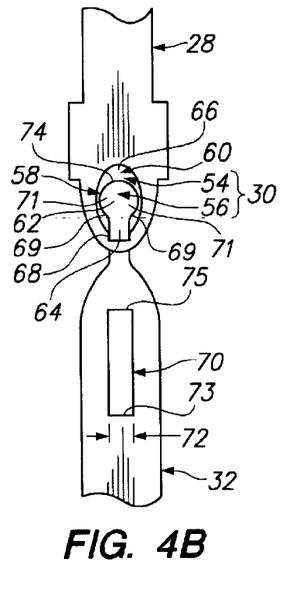
Figure 4C:
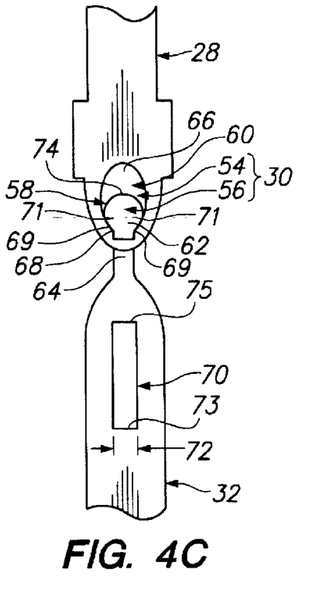

The design of the buckle 30 can be varied to suit the design requirements of the cartridge 22 and the tape drive 10. For example, FIGS. 4A–4C illustrate a buckle 30 that can be used to securely couple the drive leader 32 to the cartridge leader 28. In this embodiment, (i) the second buckle component 56 includes a tab 58 integrally formed into a distal end of the drive leader 32, and (ii) the first buckle component 54 includes a receiver 60 integrally formed into a distal end of the cartridge leader 28. FIGS. 4A–4C sequentially illustrate the tab 58 of the drive leader 32 being inserted and subsequently connected to the receiver 60 of the cartridge leader 28. More specifically, FIG. 4A illustrates the buckle 30 in an uncoupled position, FIG. 4B illustrates the buckle 30 in an intermediate position and FIG. 4C illustrates the buckle 30 in a coupled position.

The tab 58 inserts into the receiver 60 to couple the drive leader 32 to the cartridge leader 28. The tab 58 includes a nose 62 and a neck 64. The receiver 60 includes a rounded hoop portion 66 and a slot portion 68. The nose 62 is dimensioned to fit through the hoop portion 66 but not the slot portion 68. The neck 64 is dimensioned to fit in both the hoop portion 66 and the slot portion 68. Stated another way, the hoop portion 66 of the receiver 60 is wide enough to receive the nose 62 and the neck 64 of the tab 58 and the slot portion 68 is wide enough to receive the neck 64 of the tab 58 but block the nose 62.

The nose 62 includes a pair of opposed proximal edges 69 that cantilever away from the neck 64 and engage the receiver 60 to couple the buckle components 54, 56. Importantly, at least one, and more preferably both of the opposed proximal edges 69 are curved or arc shaped. The nose 62 defines a pair of opposed ears 71 that cantilever away from the neck 64. As a result of the rounded proximal edges 69, the nose 62 readily slides out of the slot portion 68 of the receiver 60 unless both of the proximal edges 69 are securely tucked within the slot portion 68. This design reduces the likelihood of partly coupled leaders 28, 32 and/or a half-ear situation in which only one of the ears 71 is positioned behind the slot portion 68. Stated another way, with this design, the receiver 60 releases the tab 58 if only one of the opposed proximal edges 69 is engaging the slot portion 68 of the receiver 60. This reduces the likelihood of a half-ear situation fooling the detector 33 and reduces the likelihood of leader runaway.

In the embodiment illustrated in FIGS. 4A–4C, the nose 62 also includes a distal end 74. Typically, the distal end 74 is rounded or arc shaped to facilitate the movement of the nose 62 into the hoop portion 66 of the receiver 60 during the coupling process. As a result thereof, the nose 62 has a rounded or oval profile. Further, each ear 71 is semi-circular shaped.

Alternately, for example, the tab and the receiver can be reversed for the buckle 30. More specifically, the tab could be formed as part of the cartridge leader 28 and the receiver can be formed as part of the drive leader 32.

The drive leader 32 also includes a buckler aperture 70 that is selectively retained by the buckler 31. The buckler aperture 70 is sized and shaped to retain a portion of the buckler 31 during the coupling process and allow that portion of the buckler 31 to slide out when the coupling process is successfully completed as provided below. The buckler aperture 70 illustrated in FIGS. 4A–4C is somewhat rectangular shaped. However, a width 72 of the buckler aperture 70 gradually increases as the distance from the second buckle component 56 increases. Stated another way, a proximal portion 73 of the buckler aperture 70 is wider than a distal portion 75 of the buckler aperture 70.

The buckler 31 moves relative to the cartridge receiver 18 to couple and uncouple the buckle 30. More specifically, the buckler 31 selectively retains and moves the drive leader 32 to couple the drive leader 32 to the cartridge leader 28. Preferably, the buckler 31 retains the drive leader 32 until the detector 33 indicates that the cartridge leader 28 is securely coupled to the drive leader 32. This feature allows the buckler 31 to move the drive leader 32 and make multiple attempts, if necessary, to couple the cartridge leader 28 to the drive leader 32. Further, this allows the tape drive 10 to notify the operator to take appropriate corrective action prior to a "leader runaway" failure.

The location and design of the buckler 31 can be varied to suit the design requirements of the tape drive 10. In the embodiment illustrated in the Figures, the buckler 31 is positioned near the rear of the cartridge receiver 18 between the take-up reel 16 and the cartridge receiver 18

Figure 5:
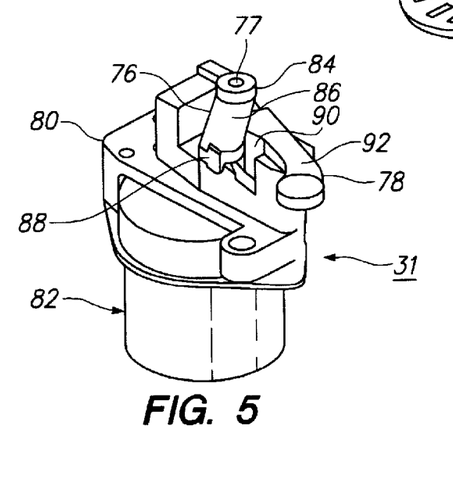
FIG. 5 is a perspective view of a buckler having features of the present invention.

FIG. 5 illustrates a perspective view of a suitable buckler 31 that can be used with the present invention. In this embodiment, the buckler 31 includes a leader retainer 76, a buckler shaft 77, a tucker 78, a buckler support 80 that mounts the buckler 31 to the drive housing 12, and a buckler mover 82.

The leader retainer 76 selectively retains the drive leader 32. In the embodiments illustrated herein, the leader retainer 76 fits within the buckler aperture 70 to selectively retain and move the drive leader 32. In the embodiment illustrated in FIG. 5, the leader retainer 76 includes (i) a tubular shaped retainer hub 84 that fits over and is rigidly secured to the buckler shaft 77, (ii) a retainer beam 86 that cantilevers away from the retainer hub 84 and (iii) a catch 88 that extends transversely from a distal end of the retainer beam 86.

The catch 88 is dimensioned to fit through a portion of the buckler aperture 70 but not the entire buckler aperture 70. More specifically, the catch 88 fits through the proximal portion 73 of buckler aperture 70 but not the distal portion 75 of the buckler aperture 70. The retainer beam 86 is designed to fit in any portion of the buckler aperture 70. Stated another way, the proximal portion 73 of the buckler aperture 70 is wide enough to receive the retainer beam 86 and the catch 88 and the distal portion 75 of the buckler aperture 70 is wide enough to receive the retainer beam 86 but block the catch 88. With this design, the catch 88 keeps the buckler 31 engaged with the drive leader 32 until the detector 33 indicates that a successful coupling has occurred. Because the catch 88 does not fit through the distal portion 75 of the buckler aperture 70, the leaders 28, 32 can be moved robustly with the leader retainer 76 securely retaining the drive leader 32.

The tucker 78 supports the tab 58 of the second buckle component 56 and moves the tab 58 towards the cartridge leader 28 for coupling with the first buckle component 54. More specifically, during coupling, the tucker 78 moves the tab 58 within the receiver 60 of the first buckle component 54.

In the embodiment illustrated in FIG. 5, the tucker 78 includes a tucker hub 90, a tucker beam 92, and a tucker spring (not shown). The tucker hub 90 loosely encircles the buckler shaft 77 below the retainer hub 84 and allows the tucker 78 to rotate, at least partly around the buckler shaft 77. The tucker beam 92 cantilevers away from the tucker hub 90. A distal end of the tucker beam 92 engages the tab 58. The tucker spring encircles the buckler shaft 77 and is connected between the buckler support 80 and the tucker 78. The tucker spring biases the tucker 78 to rotate in a clockwise direction. As the leader retainer 76 rotates clockwise, the tucker 78 follows the leader retainer 76 until the tucker 78 engages and contacts a stop (not shown) on the buckler support 80.

The buckler mover 82 moves the buckler 31 to couple and decouple the drive leader 32 to the cartridge leader 28. In the embodiments illustrated in the Figures, the buckler mover 82 rotates the buckler shaft 77 and the leader retainer 76. The design of the buckler mover 82 can be varied. For example, the buckler mover 82 illustrated is a small, electric stepper motor.

The buckling system 20 also includes a detector 33 that checks to determine if the cartridge leader 28 is securely coupled to the drive leader 32. This feature allows the tape drive 10 to make multiple attempts, if necessary, to couple the drive leader 32 to the cartridge leader 28.

The detector 33 determines if the drive leader 32 is securely coupled to the cartridge leader 28. This feature allows the tape drive 10 to make multiple attempts, if necessary, to couple the cartridge leader 28 to the drive leader 32. Further, this allows the tape drive 10 to notify the operator to take appropriate corrective action prior to a "leader runaway" failure.

The design and location of the detector 33 can be varied to suit the design requirements of the tape drive 10. In the embodiment illustrated in the Figures, the detector 33 monitors and measures rotation of one of the tape guides 44. More specifically, the detector 33 monitors rotation of the tape guide 44 closest to the take-up reel 16 to determine if buckling was successful. With this information, the detector 33 is able to determine if the leaders 28, 32 are securely coupled.

Figure 6A:
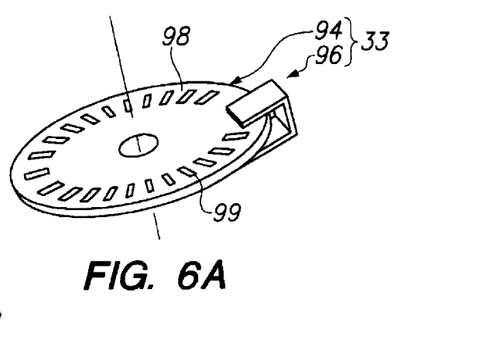
FIG. 6A is a perspective view of a detector having features of the present invention.
Figure 6B:
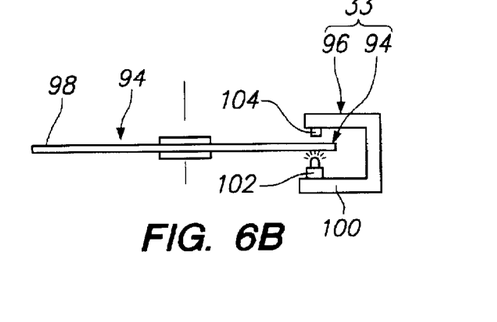
FIG. 6B is a side plan view of the detector of FIG. 6A.

FIG. 6A illustrates a top perspective view and FIG. 6B illustrates a side plan view of a detector 33 having features of the present invention. In particular, this type of detector 33 is commonly referred to as an encoder. The detector 33 includes a detector disk 94 and a sensor 96.

The detector disk 94 is secured to one of the tape guides 44 and rotates with one of the tape guides 44. In the embodiment illustrated in the Figures, the detector disk 94 is secured to and rotates with the guide body 46 of the tape guide 44 closest to the take-up reel 16. The detector disk 94 includes (i) an opaque disk body 98 and (ii) a plurality of spaced apart, radially oriented, transparent, windows 99. The shape, number and spacing of the windows 99 in the detector disk 94 can be varied. For example, a suitable detector disk 94 can include between approximately 180 and 360 spaced apart windows 99. The windows 99 illustrated in FIG. 6A are provided to facilitate the discussion of the detector 33.

The sensor 96 measures and monitors the movement of the detector disk 94. More specifically, the sensor 96 measures the amount of rotation of the detector disk 94. The design of the sensor 96 can be varied. For example, in the embodiment illustrated in FIG. 6B, the sensor 96 includes a "C" shaped detector body 100, an illumination source 102 and a sensor receiver 104. The detector body 100 is secured to the drive housing 12 and maintains the illumination source 102 and the sensor receiver 104 on opposite sides of the detector disk 94.

The illumination source 102 directs a light beam at the detector disk 94 near the windows 99 at the sensor receiver 104. The sensor receiver 104 detects light. The detector disk 94 rotates relative to the detector sensor 96. As the detector disk 94 is rotated, the light from the illumination source 102 is directed towards the disk body 98 near the windows 99. Depending on the orientation of the detector disk 94, the light beam is either directed at one of the windows 99 or the disk body 98 between adjacent windows 99. The windows 99 allow the light to pass to the sensor receiver 104 while the disk body 98 blocks the passage of light to the sensor receiver 104. With this design, the sensor receiver 104 detects and counts the number of successive windows 99 that are moved into the path of the light beam. By counting the number of windows 99 that are successively positioned in the path of the light beam, the detector sensor 96 monitors the rotation of the detector disk 94 and one of the tape guides 44.

Figure 7A:
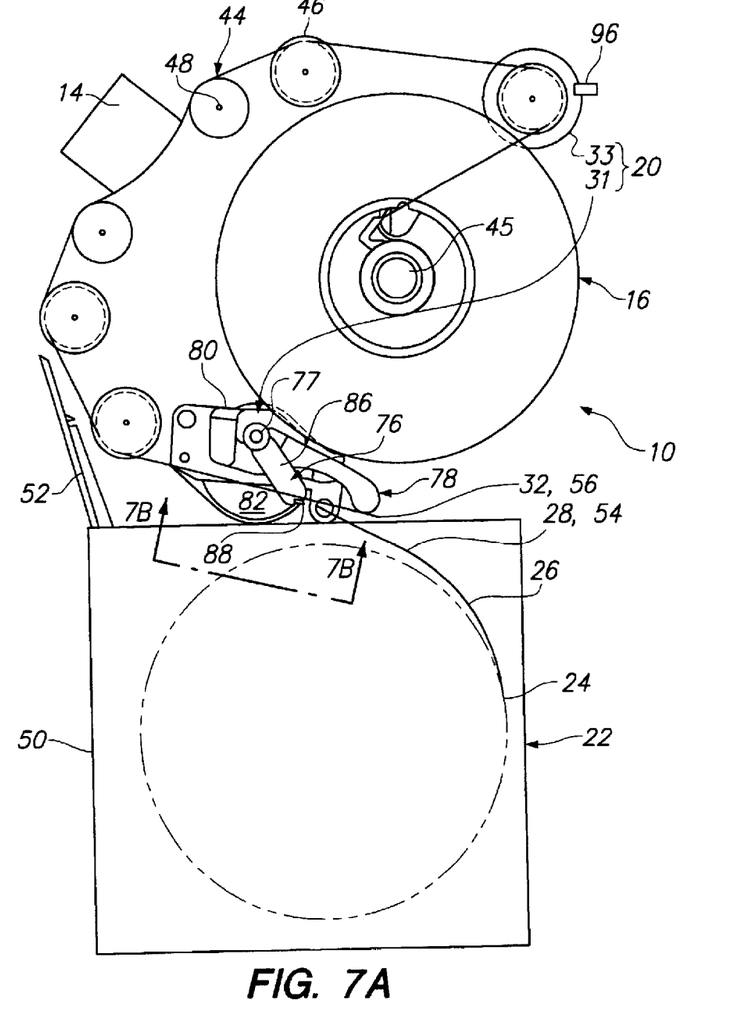
FIG. 7A is a simplified top plan illustration of a cartridge and a portion of a tape drive during buckling.
Figure 7B:
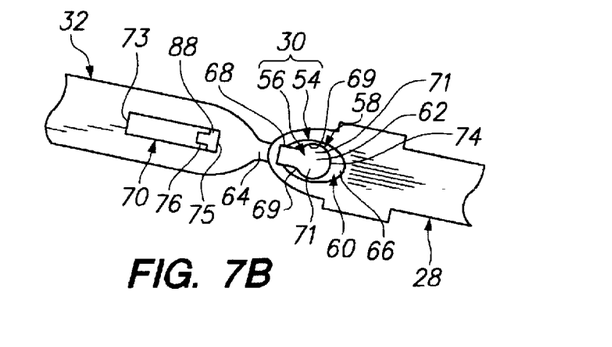
FIG. 7B is a view of a portion of the drive leader and the cartridge leader taken on line 7B—7B in FIG. 7A.
Figure 8A:
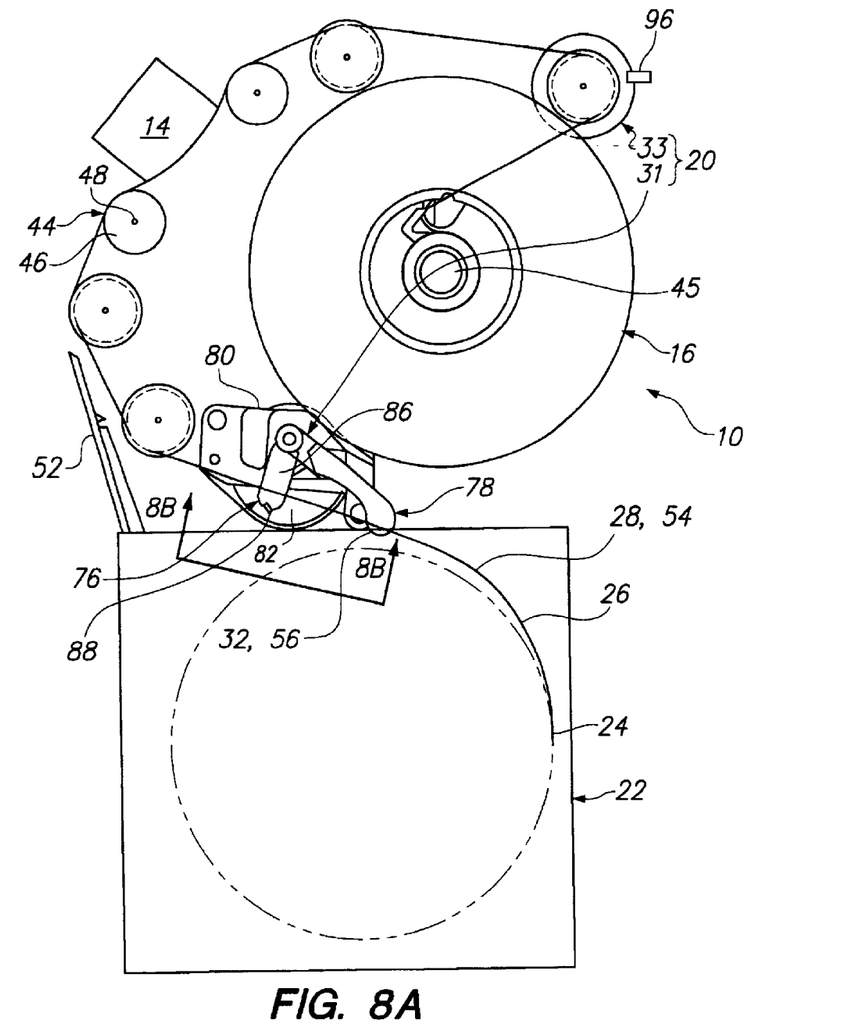
FIG. 8A is a simplified top plan illustration of the cartridge and a portion of a tape drive during buckling.
Figure 8B:
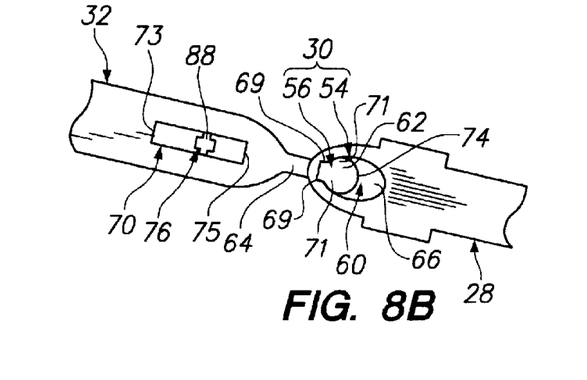
FIG. 8B is a view of a portion of the drive leader and the cartridge leader taken on line 8B—8B in FIG. 8A.
Figure 9:
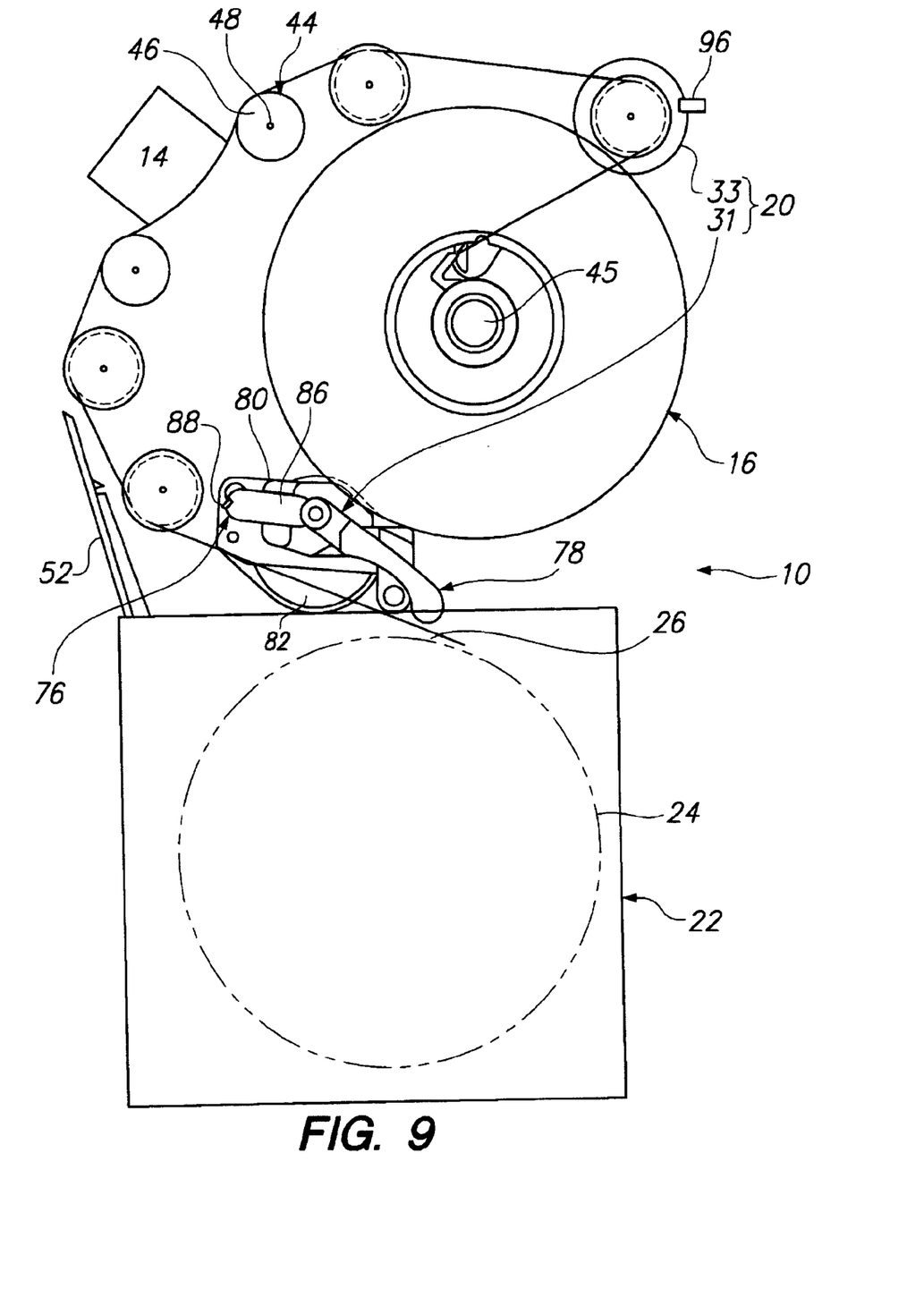
FIG. 9 is a simplified top plan illustration of the cartridge and a portion of the tape drive during buckling.

The operation of the buckling system 20 and buckle 30 can probably best be understood with reference to FIGS. 2 and 7A–9. In particular, FIGS. 7A, 8A and 9 illustrate a top view of a portion of the tape drive 10 and the cartridge 22 at alternate stages of coupling. More specifically, FIG. 7A illustrates the relative positions of the take-up reel 16, the buckler 31 and the buckle 30 upon insertion of the cartridge 22. FIG. 8A illustrates the relative positions of the take-up reel 16, the buckler 31 and the buckle 30 during testing to determine if the buckling was successful. FIG. 9 illustrates the relative positions of the take-up reel 16, the buckler 31 and the buckle 30 after successful buckling. A number of components of the tape drive 10 are omitted from FIGS. 7A, 8A and 9 for clarity. FIGS. 7B and 8B are cut-away views of the leaders 28, 32.

Initially, the cartridge 22 is inserted into the cartridge receiver 18. Insertion of the cartridge 22 causes the cartridge door 52 to engage the protruding wall 53 and rotate to the open position. Referring to FIGS. 7A and 7B, when the cartridge 22 is inserted, the tab 58 is positioned near the hoop portion 66 of the receiver 60. In FIG. 7A, the buckler 31 is in an uncoupled position. In this position, the buckler 31 retains the drive leader 32 so that the tab 58 is positioned near the hoop portion 66 of the receiver 60 when the cartridge 22 is inserted into the cartridge receiver 18.

Next, the take-up motor 45 rotates the take-up reel 16 in the clockwise direction. At the same time, the buckler mover 82 rotates the leader retainer 76 clockwise to the position illustrated in FIG. 8A. As the leader retainer 76 rotates clockwise, the tucker 78, which is biased in the clockwise direction, tucks the nose 62 of the tab 58 into the hoop portion 66 of the receiver 60. This allows the neck 64 of the tab 58 to subsequently slide into the slot portion 68 of the receiver 60 as illustrated in FIG. 8B. In this position, the buckle 30 is securely coupled. During this part of the coupling process, the detector 33 monitors the amount of rotation in the clockwise direction of the tape guide 44 closest to the take-up reel 16.

Next, tape drive 10 tests to make sure that coupling was successful. More specifically, the cartridge reel motor 49 rotates the cartridge reel 24 in the counterclockwise direction. This pulls the cartridge leader 28 towards the cartridge 22. If the two leaders 28, 32 are securely coupled, the drive leader 32 will move towards the cartridge 22 and the detector 33 will detect and measure counterclockwise rotation of the tape guide 44 closest to the take-up reel 16. If the detector 33 does not sense the rotation in the counterclockwise direction, the two leaders 28, 32 were not successfully coupled.

As illustrated in FIG. 8B, the buckler 31 is in a test position during the test to make sure that coupling was successful. More specifically, the leader retainer 76 is still positioned within the distal portion 75 of the buckler aperture 70 during testing of the adequacy of the coupling process. With this design, the leader retainer 76 is maintained within the buckler aperture 70 until the detector 33 determines that the buckling process was successful. This prevents leader runaway.

In the event the detector 33 determines that coupling was not successful, the leader retainer 76 will be rotated counterclockwise by the buckler mover 82 to the uncoupled position illustrated in FIG. 7A and the coupling operation can be repeated. After a set number of unsuccessful attempts at coupling, the tape drive 10 can indicate to an operator that the cartridge 22 may be defective.

If the coupling operation is successful then the leader retainer 76 is further rotated in the clockwise direction by the buckler mover 82 so that the catch 88 slides out of the proximal portion 73 of the buckler aperture 70 in the drive leader 32. Subsequently, the buckler mover 82 rotates the leader retainer 76 away from the tape path as illustrated in FIG. 9. After the leaders 28, 32 are coupled, rotation of the take-up reel 16 results in movement of the storage tape 26 from the cartridge reel 24 past the data transducer 14 to the take-up reel 16.

The steps of (i) rotating the take-up reel 16 in the clockwise direction and watching for rotation of the tape guide 44 in the clockwise direction with the detector 33 and (ii) subsequently rotating the cartridge reel 24 in the counterclockwise direction and watching for rotation in the counterclockwise direction can be repeated if necessary to test the sufficiency of the coupling process.

Importantly, as provided above, at least one, and more preferably both of the opposed proximal edges 69 are curved or arc shaped. As a result of the rounded proximal edges 69, the nose 62 slides out of the slot portion 68 of the receiver 60 unless both of the proximal edges 69 are securely tucked within the slot portion 68. This design reduces the likelihood of partly coupled leaders 28, 32 and/or a half-ear situation in which only one of the ears 71 is positioned behind the slot portion 68. Stated another way, with this design, the receiver 60 releases the tab 58 if only one of opposed proximal edges 69 is engaging the slot portion 68 of the receiver 60. This reduces the likelihood of a half-ear situation fooling the detector 33.

To unbuckle the leaders 28, 32, the storage tape 26 is wound back onto the cartridge reel 24. At this time, the buckle 30 will be right in front of the buckler 31. The leader retainer 76 is rotated counter-clockwise by the buckler mover 82 so that the catch 88 and the retainer beam 86 slides through the proximal portion 73 of the buckler aperture 70. Additional rotation of the leader retainer 76 moves the retainer beam 86 into the distal portion 75 of the buckler aperture 70. Further rotation of the leader retainer 76 results in the leader retainer 76 moving the drive leader 32 to the unbuckle position and the tab 58 being moved into the hoop portion 66 of the receiver 60. This also allows the tucker 78 to rotate counter-clockwise so that the nose 62 of the drive leader 32 is released out of the hoop portion 66 of the receiver 60. Subsequently, the cartridge 22 can be ejected out of the cartridge receiver 18.

While the particular tape drive 12 and buckle 30 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A combination comprising:
   a cartridge including a cartridge leader having a receive; and
   a tape drive including a drive leader that engages the cartridge leader, the drive leader including a tab having a nose including a distal end, a neck having a longitudinal axis, and two opposed ears, each ear having art edge, each edge having a proximal section and a distal section, the distal secticon being positioned closer to the distal end of the nose than the proximal section, wherein at least one of the proximal sections forms a curve with the neck, at least one of the proximal sections engages the receiver, and no portion of fit least one of the proximal sections is substantially perpendicular to the longitudinal axis of the neck.

2. The combination of claim 1 wherein each of the proximal sections forms a curve with the neck of the tab.

3. The combination of claim 1 wherein each of the proximal sections engages the receiver.

4. The combination of claim 3 wherein each of the proximal sections forms a curve with the neck of the tab.

5. The combination of claim 1 wherein the nose includes a perimeter that is substantially continuously arc-shaped.

6. The combination of claim 1 wherein the entire nose has a substantially flat configuration.

7. The combination of claim 1 wherein the nose is positioned at an end of the drive leader.

8. The combination of claim 1 wherein the nose and the neck have a substantially similar thickness to each other.

9. A tape drive for use with a cartridge, the cartridge including a cartridge leader having a receiver, the tape drive comprising:
   a drive leader including a tab having a nose including a distal end, a neck having a longitudinal axis, and two opposed ears, each ear halting an edge, each edge having a proximal section and a distal section, the distal section being positioned closer to the distal end of the nose than the proximal section, wherein at least one of the proximal sections forms a curve with the neck, at least one of the proximal sections engages the receiver, and no portion of at least one of the proximal sections is substantially perpendicular to the longitudinal axis of the neck.

10. The tape drive of claim 9 wherein each of the proximal sections forms a curve with the neck of the tab.

11. The tape drive of claim 9 wherein each of the proximal sections engages the receiver.

12. The tape drive of claim 11 wherein each of the proximal sections forms a curve with the neck of the tab.

13. The tape drive of claim 9 wherein the nose includes a perimeter that is substantially continuously arc-shaped.

14. The tape drive of claim 9 wherein the entire nose has a substantially flat configuration.

15. The tape drive of claim 9 wherein the nose is positioned at an end of the drive leader.

16. The tape drive of claim 9 wherein the nose and the neck have a substantially similar thickness to each other.

17. A combination including a cartridge and the tape drive of claim 9 that receives at least a portion of the cartridge.

18. A method for coupling a drive leader of a tape drive to a cartridge leader of a cartridge, the method comprising the steps of:
    securing a receiver to the cartridge leader;
    securing a tab to the drive leader the tab including a nose having a distal end, a neck having a longitudinal axis, and two opposed ears, each ear including an edge, each edge having a proximal section and a distal section, the distal section being positioned closer to the distal end of the nose than the proximal section, at least one of the proximal sections forming a curve with the neck, and no portion of at least one of the proximal sections being substantially perpendicular to the longitudinal axis of the neck; and
    engaging the receiver of the cartridge with at least one of the proximal sections.

19. The method of claim 18 wherein the step of securing a tab includes each proximal section forming a curve with the neck.

20. The method of claim 18 wherein the step of engaging the receiver includes engaging the receiver with each of the proximal sections.

* * * * *